T. J. CUPSTID.
HUB AND AXLE CONNECTION.
APPLICATION FILED APR. 22, 1912.
1,062,226.
Patented May 20, 1913.
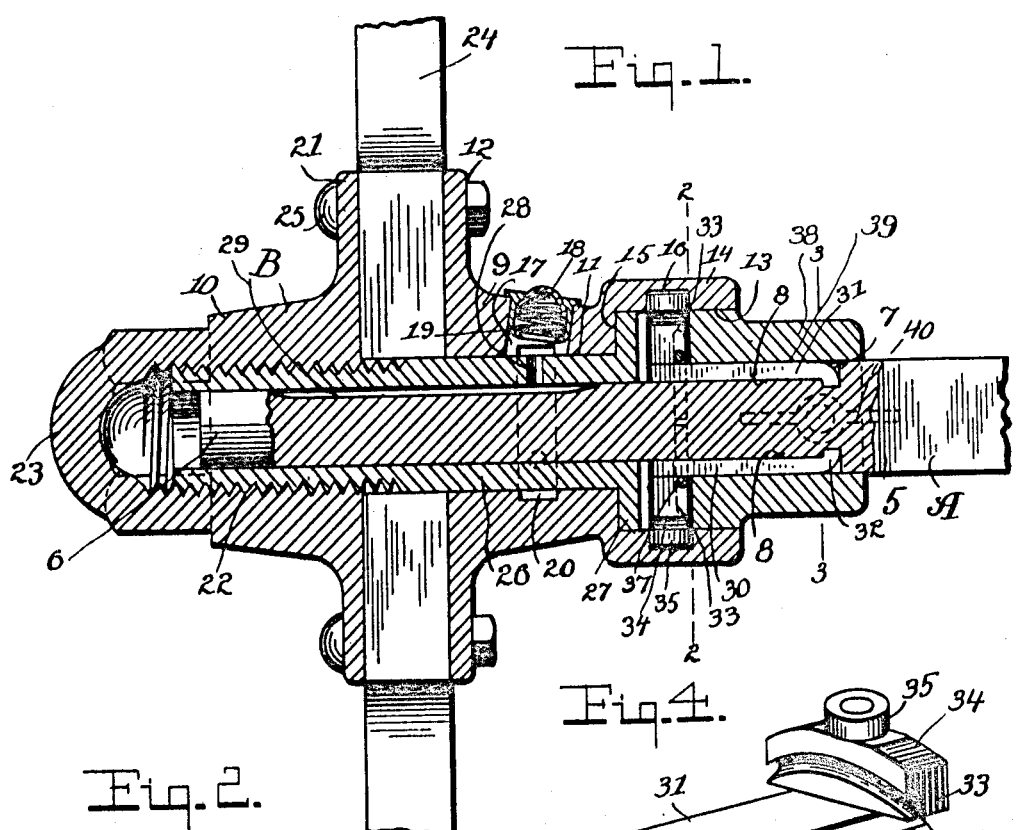
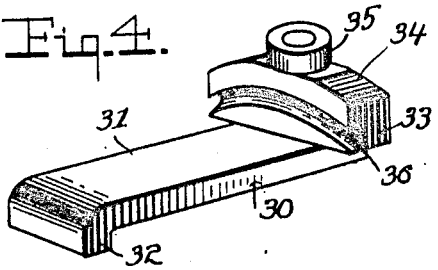
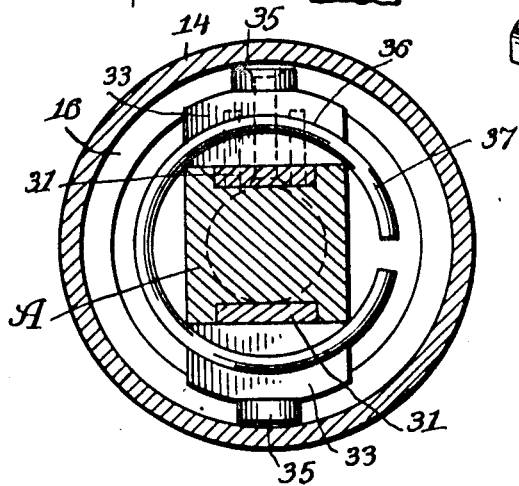
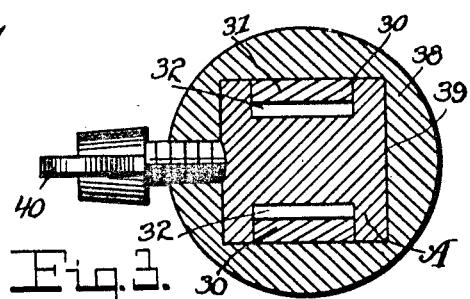
Inventor
T. J. Cupstid.
Witnesses

UNITED STATES PATENT OFFICE.

THOMAS J. CUPSTID, OF BLANEY, SOUTH CAROLINA.

HUB AND AXLE CONNECTION.

1,062,226.  Specification of Letters Patent.  Patented May 20, 1913.

Application filed April 22, 1912. Serial No. 692,388.

*To all whom it may concern:*

Be it known that I, THOMAS J. CUPSTID, a citizen of the United States, residing at Blaney, in the county of Kershaw, State of South Carolina, have invented certain new and useful Improvements in Hub and Axle Connections; and I do hereby declare the following to be a full, clear, and exact description of the invention, such as will enable others skilled in the art to which it appertains to make and use the same.

This invention relates to improvements in hub connections.

The principal object of the invention is to provide a connection between the axle and hub of such construction as to permit the latter to be readily engaged with or detached from the former, and which, when in the former position, will be positively held to the axle without danger of the same becoming accidentally detached.

Another object of the invention is to provide a connection of the character described in which there is provided a novel pair of clutch fingers adapted for clutching the hub and axle and arranged to prevent longitudinal movement of the hub yet permitting of axial rotation of the hub around the axle.

A further object of the invention is to provide a hub and axle of such construction as to positively exclude dirt and other foreign elements and thereby greatly prolong the life of the hub and axle.

A still further object of the invention is to provide a connection for the purpose described which is composed of a relatively few number of parts, is therefore simple in construction, and is cheap to manufacture.

With these and other objects in view, the invention consists in the construction and novel combination of parts hereinafter fully described, illustrated in the accompanying drawing and pointed out in the claims hereto appended; it being understood that various changes in the form, proportion, size and minor details of construction within the scope of the claims may be resorted to without departing from the spirit or sacrificing any of the advantages of the invention.

In the drawing: Figure 1 is a longitudinal sectional view through a hub and axle constructed in accordance with my invention, parts thereof being shown in elevation, Fig. 2 is a detail transverse sectional view taken on the line 2—2 of Fig. 1, Fig. 3 is a similar view taken on the line 3—3 of Fig. 1, and Fig. 4 is a perspective view of one of the clutch fingers.

Like reference numerals designate corresponding parts in all the figures of the drawing.

Referring to the drawing, A designates an axle and B the hub.

The axle A comprises a rectangular major portion 5 which is reduced at its ends to form spindles 6, one of said spindles only being shown. Formed in opposite faces of the axle proper in spaced relation to the spindle 6 are opposed transverse grooves 7—7, and communicating with said grooves and with the spindle are longitudinal seats 8—8, the grooves 7 being deeper than said seats.

The hub B comprises a pair of opposed inner and outer sections 9 and 10 respectively. The inner section 9 is formed with the usual bore 11 and with a lateral flange 12. The inner end of the section 9 is formed with a counterbore 13 which forms a consequent terminal flange 14 and a shoulder 15. Centrally formed in the flange 14 and registering with the bore 13 is an annular groove 16. Formed in the section 9 between the flanges 12 and 14 is a lateral opening 17 in which is mounted a valve casing 18 wherein is located a spring actuated valve 19, the opening registering with the bore 11 of the section. Also formed in the section 9 is an annular groove 20 which registers with the opening 17 and with the bore 11.

The outer section 10 includes the usual flange 21 which is disposed in opposed relation to the flange 12. This section is formed with a threaded bore 22 and with a closed outer end 23. Disposed between the flanges 12 and 21 of the inner and outer sections 9 and 10 is a series of spokes 24, said spokes being connected to the flanges by means of bolts 25 or other suitable fastening means. It will thus be observed that by means of these bolts the sections 9 and 10 and the spokes 24 are held in fixed relation.

My invention further comprises an axle box 26 having its outer end threaded for engagement with the threaded bore 22 of the outer section 10, and having its inner end formed with an end flange 27 which is disposed against the shoulder 15 formed by the counterbore 13 of the inner section 9. Formed in this box is a plurality of radial ports 28 which communicate with the groove 20 of the inner section 9 of the hub and with the interior of the box. The spindle 6 of the axle A is of course inserted within the box 26, and this spindle is formed with a longitudinal groove 29 which registers with the ports 28 above described when the hub rotates.

In order to lock the hub to the axle I have provided an opposed pair of clutch elements which are each designated as a whole by the reference numeral 30. Each clutch element includes a shank 31 which is of a size to freely fit within a respective seat 8 of the axle. One end of each shank is bent at right angles to form a transversely disposed finger 32 which is engaged within a respective transverse recess 7 of said axle. The outer end of each shank 31 is formed with an offset head 33, said head projecting in a direction opposite the finger 32 and having an arcuate outer face 34. This head is disposed within the counterbore 13 of the inner section 9 of the hub and is in registration with the annular groove 16. Centrally carried by the outer face 34 of the head 33 of each clutch finger 30 is an anti-friction roller 35 which is operable within the groove 16. Formed in the inner face of each head 34 is an arcuate groove 36, and disposed within said grooves is an open circular spring 36 which serves to retain the clutch fingers 30 in their spaced and operative positions ready to receive the spindle 6.

In order to prevent any possibility of the shanks 31 of the fingers 30 rising and thereby becoming disengaged from the axle A, I have provided a chuck 38 which is formed with a rectangular bore 39 of a size to freely slide over the major portion 5 of the axle A. The outer end of the chuck is normally seated within the inner end of the bore 13 of the flange 14, and this chuck is held from longitudinal movement along the axle by means of a set screw 40 or other suitable means.

In practice, when it is desired to disengage the hub from the axle, the set screw 40 is first unscrewed and the chuck 39 is then slid inwardly over the axle A. The inner ends of the shanks 31 of the clutch elements 30 are then raised sufficiently to permit of the fingers 32 to pass over the spindle 6 of the axle. The hub is then withdrawn from the spindle as will be readily understood. In this position the spring 37 will retain the clutch elements 30 in their proper spaced positions ready to receive the spindle 6 whenever it should be desired to re-assemble the parts. It will further be observed that when the hub is attached to the axle, the fingers 32 will readily seat themselves within the respective transverse recesses 7. The spring valve 19 can be readily depressed so as to admit of oil or other lubricant, said lubricant passing through the valve casing 18 and into the annular groove 20, and from this groove the lubricant will readily pass through the ports 28 to the longitudinal groove 29 of the spindle 6, and thereby lubricate the axle. It will also be observed that by this construction dust and other foreign elements will be prevented from entering between the spindle 6 and the axle box 26, and as a result, the life of the hub and axle will be greatly prolonged.

What is claimed is:

1. The combination with an axle having a spindle, the axle being formed with opposed transverse grooves and longitudinal seats communicating with the spindle and grooves, of a hub on said spindle, a lateral flange projecting inwardly from the inner end of the hub and disposed around and in spaced relation to the axle, and an opposed pair of clutch elements connecting the hub and axle, each element including a shank engageable within the seat of the axle, a finger extending from one end of the shank and disposed within a communicating transverse groove of the axle, and a head projecting from the other end of the shank and having a loose connection with the flange of the hub.

2. The combination with an axle having a spindle, the axle being formed with opposed transverse grooves and longitudinal seats communicating with the spindle and grooves, of a hub on said spindle, a lateral flange projecting inwardly from the inner end of the hub and disposed around and in spaced relation to the axle, the inner face of the flange being centrally formed with an annular groove, an opposed pair of clutch elements connecting the hub and axle, each element including a shank engageable within a seat of the axle, a finger extending from one end of the shank and disposed within a communicating transverse groove of the axle, a head projecting from the other end of the shank, an anti-friction roller carried by the head and engageable within the groove of the hub, a spring connected to the heads of the clutch elements to hold them in spaced relation when the hub is disconnected from the axle.

In testimony whereof, I affix my signature, in presence of two witnesses.

THOMAS J. CUPSTID.

Witnesses:
H. M. POPHAM,
S. GEORGE TATE.

Copies of this patent may be obtained for five cents each, by addressing the "Commissioner of Patents, Washington, D. C."